Figure 1:
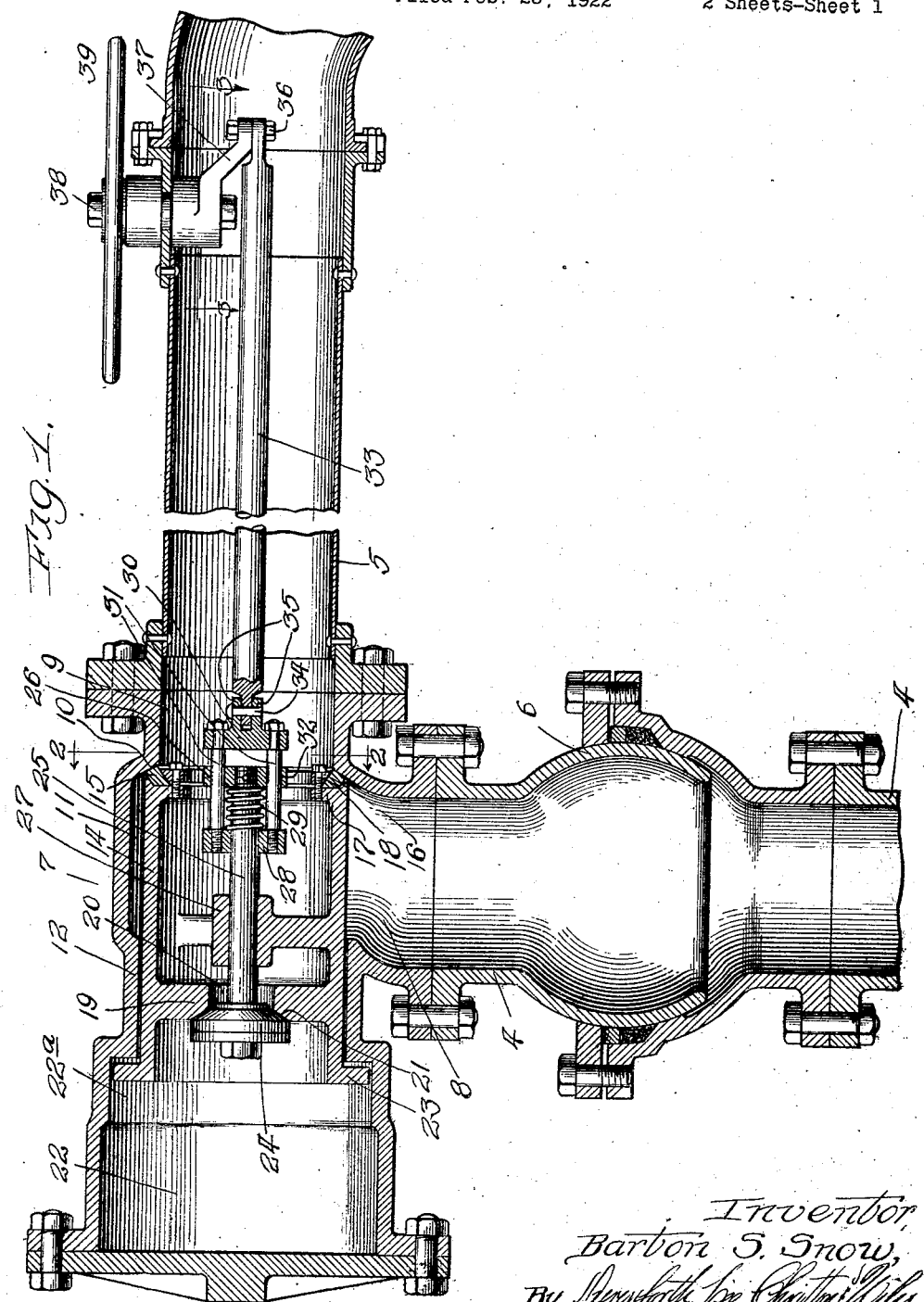

May 4, 1926.

B. S. SNOW 1,583,427

VALVE MECHANISM

Filed Feb. 23, 1922

2 Sheets-Sheet 1

Inventor
Barton S. Snow,
By Dyrenforth, Lee, Chritton & Wiles
Attys.

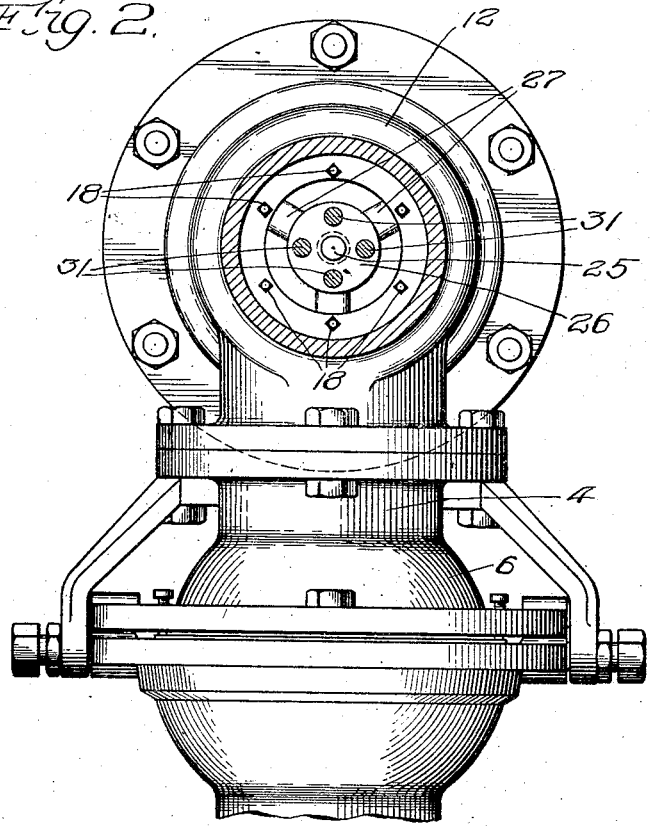
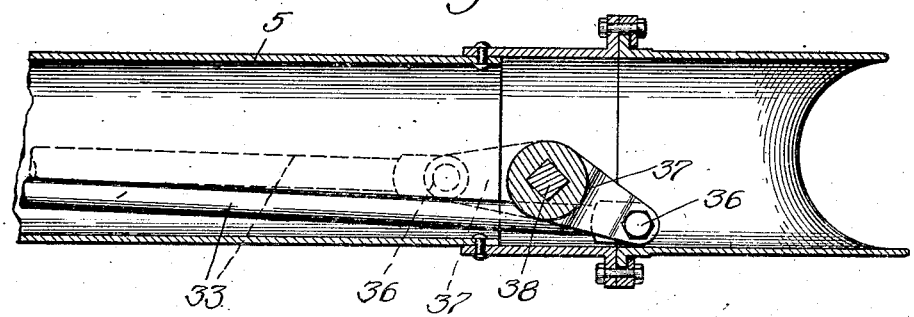

Patented May 4, 1926.

1,583,427

UNITED STATES PATENT OFFICE.

BARTON S. SNOW, OF BATAVIA, ILLINOIS.

VALVE MECHANISM.

Application filed February 23, 1922. Serial No. 538,718.

*To all whom it may concern:*

Be it known that I, BARTON S. SNOW, a citizen of the United States, residing at Batavia, in the county of Kane and State of Illinois, have invented a new and useful Improvement in Valve Mechanism, of which the following is a specification.

My invention relates to a valve mechanism for use more particularly, though not exclusively, in cranes such as oil and water cranes through which large streams of the liquid flow, to control the flow of liquid therefrom; and my primary objects are to provide a novel, simple and positively operating construction of valve mechanism which shall require the exertion of relatively slight force only, by the operator to open the valve; to provide the minimum of resistance to the flow of the liquid through the valve when the latter is in open condition; and to provide against hammering action in the closing of the valve and insure proper closure of the latter.

Referring to the accompanying drawings:

Figure 1 is a broken view in vertical sectional elevation of a crane in which my improved valve mechanism is incorporated for controlling the flow of the liquid through the crane. Figure 2 is a section taken at the line 2—2 on Fig. 1 and viewed in the direction of the arrows; and Figure 3, a section taken at the line 3—3 on Fig. 1 and viewed in the direction of the arrows.

In the particular construction illustrated my improved valve device is shown as provided at the upper end of the tubular column of the crane and represented at 4 and which, in accordance with common practice, connects at its lower end with the source of liquid under-pressure, to be delivered by the crane, the valve mechanism referred to controlling the discharge of the liquid from the column 4 into the laterally extending pipe section of the crane and represented at 5. The column 4 is shown as formed of sections connected together through the medium of a ball and socket joint represented at 6, to adapt the outlet of the crane to be moved into different positions of adjustment relative to the receptacle to be filled from the crane, no claim being made in this application to any features of the crane, other than the valve mechanism, as such features form the subject of another application filed by me concurrently herewith.

The valve mechanism referred to comprises a housing, or casing, provided with an inlet 8 at its lower end and an outlet 9 extending at an angle to the plane of the inlet 8, the inlet of the casing 7 being connected with the upper end of the column 4, and the outlet 9 being connected with the lateral pipe section 5. The outlet 9 is surrounded by an annular tapered valve seat 10, and in the rear of this valve seat the inner wall of the casing 7 is cored out to provide an annular channel 11 communicating with the inlet 8, the casing beyond the channel 11, and represented at 12, forming a bearing in which the piston valve, hereinafter referred to slides.

The piston valve above referred to is represented at 14, and is provided with an annular valve-seat-portion 15 adapted to bear against the seat 10 in the closed position of this valve, this seating-portion being shown as formed of a ring held in place on the body of the piston 14 by a ring 16 secured to an annular flange 17 at this end of the piston valve 14, as by means of the screws 18, whereby the interior of the piston 14 is in communication at all times with outlet 9. The piston valve 14 is provided at its opposite end with a partition 19 containing an opening 20 therethrough preferably annularly tapered as represented at 21, this opening forming a communication between the interior of the piston and the space represented at 22 at the left hand end of the casing in Fig. 1, the piston valve 14 being provided with an annular, outwardly projecting, flange 23 which extends into the space 22 in the casing. The space 22 adjacent the portion 12 of the casing, this portion of the space being represented at 22ª, is of reduced diameter as compared with the diameter of the remainder of this space but of larger diameter than the piston-valve 14, the flange 23 extending into the reduced portion 22ª of the space 22 when the valve 14 is in closed condition.

An auxiliary valve is provided for controlling the opening 20, this valve comprising a valve proper 24 adapted when in closed position to engage the seat 21 and close communication between the interior of the piston valve 14 and the compartment 22 of the casing 7; a valve stem 25 to one end of which the valve proper 24 is connected; a disk 26 to which the opposite end of the valve stem 25 is connected; valve stem 25 being slidably mounted in a bearing 27 located in, and rigid with, the piston valve 14; a disk 28 surrounding, and slidable on, the valve stem 25; a coiled spring 29 surrounding the valve stem 25 and confined between the disks 26 and 28; a disk 30 located in the outlet 9 and connected with the disk 28, as through the medium of the bolts represented at 31, which extend through, and slide in, the openings 32 in the disk 26; and means connected with the disk 30 and through the medium of which the latter is operated for a purpose hereinafter described, these means comprising a rod 33 located within the pipe section 5 and extending lengthwise thereof, one end of this rod being pivotally connected, as indicated at 34, with ears 35 provided on the disk 30, and the opposite end of this rod being pivotally connected, as by a pin 36, with the outer end of a crank arm 37 journalled at 38, in the pipe section 5 and provided with a hand wheel 39 through the medium of which the crank 37 is actuated.

The valve mechanism is operated to the closed position represented in the drawing by the operator rotating the hand wheel 39 in clockwise direction in Fig. 3 to move the crank 37 from the dotted position represented therein into the full line position therein shown, in which condition of the apparatus the valves 24 and 14 are drawn into engagement with the seats 21 and 10, respectively. The fit between the piston valve 14 and the portion 12 of the casing 7 is preferably a relatively loose one, whereby the liquid under pressure in the column 4 flows into and through the space between the piston 14 and the portion 12 of the valve casing and thence into the compartment 22, the pressure of the liquid in this compartment becoming substantially equal to the liquid pressure in the column 4 and operating, by reason of the fact that the area exposed by the end of the cylinder exposed to the liquid in the compartment 22 and tending to force the piston to the right in Fig. 1 is greater than the area of the piston exposed in this compartment to the liquid therein tending to force it to the left in this figure, it being understood that the piston 14 is thus of the differential type, to force the piston valve 14 firmly against the seat 10 and insure the maintenance of a tight joint between the inlet 8 and the outlet 9 of the valve casing, the pressure of the liquid in the space 22 against the valve proper 24, also firmly forcing, and holding, this valve to its seat.

When it is desired to open the valve, the operator swings the crank 37 to the dotted position illustrated in Fig. 3. The initial movement of the crank 37 operates merely to force the rod 33, the disks 28 and 30 and the connecting rods 31 to the left in Fig. 1, the rods 31 sliding in the disk 26. In the continued movement of the parts just stated, the disk 30 engages the disk 26 and forces the valve 24 to the left in Fig. 1 to open position with the result of releasing the liquid pressure in the compartment 22, the liquid therein escaping therefrom through the piston 14 and into the outlet pipe 5. Following the opening of the valve 24 as stated, the disk 28 engages the bearing 27, rigid with the piston 14, and continued movement of the crank 37 to final position (dotted lines in Fig. 3), bodily shifts the piston 14 to the left in Fig. 1 to full open position, whereupon the liquid flows freely from the column 4 through the inlet 8, the interior of the valve casing 11 and out through the outlet 9 to and through the pipe 5. The valve mechanism remains in the open position just stated, until the operator actuates the crank 37 to return it to the full line position shown in Fig. 3. Thus operating the crank first causes the valve 24 to be drawn to closed position, through the medium of the spring 29, and thereafter the valve 14 to be moved to closed position by the engagement therewith of the valve 24, under the continued draft upon the rod 33. Thus, while both of the valves 24 and 14 are opened through the medium of relatively rigidly engaging parts, as stated, the movement of these valves to closed position is through the medium of a yielding connection, namely, the spring 29.

It will be noted that in the particular arrangement shown the periphery of the flange 23 extends quite closely to the cylindrical wall of the portion $22^a$ of the space 22, whereas the portion of the space therebeyond, is of considerably larger internal diameter. Thus, in the initial movement of the piston valve 14 to closed position, the liquid extending at the righthand side of the flange 23 in Fig. 1, is quite rapidly displaced by the movement of the piston, so that the valve 14 moves quite rapidly toward closed position, but as soon as the flange 23 registers with the reduced portion $22^a$, the speed of the piston 14 in moving to closed position is accordingly reduced, owing to the relatively small space provided between the flange 23 and the inner periphery of the portion $22^a$ which causes relatively great resistance to be afforded to the displacement of the liquid at the right hand side of the flange 23 in Fig. 1. As a consequence the movement of the piston 14 to closed position, is cushioned, avoiding hammering action by the liquid.

The arrangement of the parts is preferably such, as shown that in the swinging of the crank-arm 37 to the position shown in Fig. 3 for closing the valves, the crank swings against the resistance of the spring 29, past the center about which it rotates and against the inner surface of the spout as shown by full lines in Fig. 3 in which position it is held by the action of the spring and thereby locking the valve-rod against moving to a position in which the valves may open.

While I have illustrated and described a particular construction involving my invention, I do not wish to be understood as intending to limit it thereto, as the same may be variously modified and altered without departing from the spirit of my invention.

What I claim as new, and desire to secure by Letters Patent, is:

1. Valve mechanism comprising a housing having an inlet port and an outlet port, a piston valve movable in said housing for controlling communication between said ports and closing in the direction of flow of liquid through said housing, the space in said housing at the rear of said valve being in communication with said inlet whereby said valve is subjected to pressure of the liquid tending to close said valve, said valve containing an opening communicating with said space and with said outlet, an auxiliary valve controlling said opening and operable to reduce the pressure of liquid against said first named valve, means operated by said piston and independent of said auxiliary valve by which liquid is displaced to the rear of said means in the movement of said piston toward closing position, said piston valve requiring that such displacement occur in order that it may move to closed position, and means whereby, as the piston nears the end of its closing movement, the said displacement of the liquid occurs at a reduced rate.

2. Valve mechanism comprising a housing having an inlet port and an outlet port, a piston valve movable in said housing for controlling communication between said ports and closing in the direction of flow of liquid through said housing, the space in said housing at the rear of said valve being in communication with said inlet whereby said valve is subjected to pressure of the liquid tending to close said valve, said valve containing an opening communicating with said space and with said outlet, an auxiliary valve controlling said opening and operable to reduce the pressure of liquid against said first named valve, means operated by said piston and independent of said auxiliary valve by which liquid in said housing is displaced to the rear of said means in the movement of said piston toward closing position, and means whereby said first named means, as the piston nears the end of its closing movement, displaces the liquid at a reduced rate.

3. Valve mechanism comprising a housing having an inlet port and an outlet port, a piston valve movable in said housing for controlling communication between said ports and closing in the direction of flow of liquid through said housing, the space in said housing at the rear of said valve being in communication with said inlet whereby said valve is subjected to pressure of the liquid tending to close said valve, said piston valve being so positioned as to require, for its movement to closed position, the application of force thereto other than by the fluid supplied to the housing, said valve containing an opening communicating with said space and with said outlet, an auxiliary valve controlling said opening and operable to reduce the pressure of liquid against said first named valve, means operated by said piston and independent of said auxiliary valve by which liquid is displaced to the rear of said means in the movement of said piston toward closing position, said piston valve requiring that such displacement occur in order that it may move to closed position, means whereby, as the piston nears the end of its closing movement, the said displacement of the liquid occurs at a reduced rate, and means for applying a force to said piston for moving it toward closed position.

4. Valve mechanism comprising a housing having an inlet port and an outlet port, a piston valve movable in said housing for controlling communication between said ports and closing in the direction of flow of liquid through said housing, the space in said housing at the rear of said valve being in communication with said inlet whereby said valve is subjected to pressure of the liquid tending to close said valve, and an auxiliary valve operable to reduce the pressure of the liquid against said first-named valve, said piston having a projection on its periphery extending into said space in said housing, and the diameter of that portion of said space into which said projection extends when said first-named valve is closed being less than the diameter of said space into which said projection extends when said first-named valve is open.

5. Valve mechanism comprising a housing having an inlet port and an outlet port, a piston valve movable in said housing for controlling communication between said ports and closing in the direction of flow of liquid through said housing, the space in said housing at the rear of said valve being in communication with said inlet whereby said valve is subjected to pressure of the liquid tending to close said valve, and an auxiliary valve operable to reduce the pressure of the liquid against said first-named valve, said piston having an annular flange about its periphery extending into said space in said housing, and the diameter of that portion of said space into which said flange extends when said first-named valve is closed being less than the diameter of said space into which said flange extends when said first-named valve is open.

BARTON S. SNOW.